(12) United States Patent
Sugaya

(10) Patent No.: US 6,205,517 B1
(45) Date of Patent: *Mar. 20, 2001

(54) MAIN MEMORY CONTROL APPARATUS FOR USE IN A MEMORY HAVING NON-CACHEABLE ADDRESS SPACE ALLOCATED TO DMA ACCESSES

(75) Inventor: Yuji Sugaya, Hitachinaka (JP)

(73) Assignee: Hitachi, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 5 days.

(21) Appl. No.: 08/832,256

(22) Filed: Apr. 3, 1997

(30) Foreign Application Priority Data

Apr. 10, 1996 (JP) ..................................... 8-088199

(51) Int. Cl.[7] ..................................... G06F 12/08
(52) U.S. Cl. ........................... 711/117; 711/118; 711/137; 711/141; 711/153; 711/173; 710/52
(58) Field of Search ..................................... 711/118, 129, 711/137, 141, 149, 153, 173, 117; 710/39, 52, 53

(56) References Cited

U.S. PATENT DOCUMENTS

| 5,224,214 | * | 6/1993 | Rosich | 711/117 |
| 5,263,142 | | 11/1993 | Watkins et al. | 395/425 |
| 5,283,883 | * | 2/1994 | Mishler | 711/137 |
| 5,317,718 | * | 5/1994 | Jouppi | 711/137 |
| 5,367,660 | * | 11/1994 | Gat et al. | 711/3 |
| 5,515,514 | * | 5/1996 | Dhuey et al. | 395/282 |
| 5,517,660 | * | 5/1996 | Rosich | 711/117 |
| 5,603,007 | * | 2/1997 | Yazdy et al. | 711/140 |
| 5,659,713 | * | 8/1997 | Goodwin et al. | 711/157 |

* cited by examiner

Primary Examiner—Hiep T. Nguyen
(74) Attorney, Agent, or Firm—Kenyon & Kenyon

(57) ABSTRACT

A CPU and a DMA device employ in common an address area from which data cannot be loaded into a cache memory. A read buffer memory and a write buffer memory loading therein data read from and written into that address area are provided. In read access from the CPU or DMA device to the common address area, if data to be accessed exists in any buffer memory, the data in the buffer memory is transferred to the CPU or DMA device. If data to be accessed does not exist in any buffer memory, data at addresses different from the read access address from the CPU or DMA device only in lower bits of fixed length is read from the main memory unit and then loaded into the buffer memory after performing data error checking and correcting of the read data.

21 Claims, 20 Drawing Sheets

FIG.2

ADDRESS $0000

CACHE LOADING
ENABLE AREA

EXCLUSIVELY
USED BY CPU

7

$XXXX
$XXXX+1

CACHE LOADING
DISABLE AREA

USED BY CPU AND DMA
DEVICE IN COMMON $YYYY

MAIN MEMORY CONTROL APPARATUS FOR USE IN A MEMORY HAVING NON-CACHEABLE ADDRESS SPACE ALLOCATED TO DMA ACCESSES

BACKGROUND OF THE INVENTION

1. Field of the Invention

The present invention relates to a main memory control apparatus capable of realizing high-speed access to a main memory unit in a computer system.

2. Description of the Related Art

Some CPU's include cache memories storing part of the contents stored in a main memory unit, aiming at high-speed access to the main memory unit. In such a CPU, consistency or sameness of data between the cache memory and the main memory unit is maintained by a snooping function that monitors access to the main memory unit from DMA (Direct Memory Access) enable devices other than the CPU.

Some of CPU's including cache memories, however, have no snooping function. Particularly, built-in CPU's which are becoming commonly used in commercial applications incorporate cache memories for improvement of performance, but often have no snooping function for cost reduction. In those CPU's having no snooping function, consistency of stored data between a cache memory and a main memory unit is secured by software.

More specifically, CPU's can be classified into two types; i.e., performance-directed CPU's intended for application to workstations and high-level personal computers, and built-in CPU's intended for application to home game machines, electronic notebooks, etc. In general, performance-directed CPU's each have a snooping function that monitors access to a main memory unit from other CPU's or DMA enable devices, taking into account its application to a system wherein a plurality of CPU's accessing to a common memory are employed to improve performance.

The provision of the snooping function ensures consistency of data between a cache memory incorporated in the CPU and a main memory unit.

On the other hand, built-in CPU's are designed with an emphasis placed on cost performance, because apparatus and equipment utilizing such built-in CPU's are relatively inexpensive. Accordingly, those CPU's incorporate cache memories for improvement of performance, but many of them have no snooping function for cost reduction. Because of versatility in applications, the built-in CPU's occupy a great proportion in the total number of CPU's brought to the market.

In the CPU's incorporating cache memories but having no snooping function, as mentioned above, consistency of data between a cache memory and a main memory unit is secured by software. The following two methods are known so far for achieving it.

(1) Any cache memory is not employed, or a storage area of the main memory unit, which is accessed by DMA enable devices other than the CPU, is allocated to an address area from which data cannot be loaded into the cache memory in the CPU.

(2) A storage area which is accessed by DMA enable devices is allocated to an address area from which data can be loaded into the cache memory in the CPU. But if data in a main storage area which is accessed by the DMA enable devices exits in the cache memory at the DMA start-up, the data in the cache memory is invalidated.

However, the above method (1) is disadvantageous in that since CPU access to all the area of the main memory unit or the area thereof which is accessed by DMA enable devices is made directly to the main memory unit, an access time is longer than that required to make access to the cache memory.

Also, in the above method (2), it is probable that each time write access to the main memory unit is made at the DMA start-up, the contents of the cache memory are invalidated. This results is disadvantages of reducing utilization of the cache memory, lowering a cache hit ratio, and prolonging an average access time of the CPU to the main memory unit.

SUMMARY OF THE INVENTION

An object of the present invention is to overcome the above-mentioned disadvantages in the prior art, and to realize a main memory control apparatus for controlling access to a main memory unit from a CPU having no snooping function and a DMA enable device, so that data access can be made to the main memory unit at a high speed while maintaining consistency of data between the cache memory and the main memory unit.

To achieve the above object, the present invention is constructed as follows.

In a main memory control apparatus for use in a computer system comprising main memory means, a CPU incorporating a cache memory, and an access enable device capable of making direct memory access to the main memory means, the main memory control apparatus controlling data access to the main memory means, the main memory control apparatus comprises a first address area allocated in a memory area of the main memory means and allowing data to be loaded into the cache memory in the CPU from the first address area but inhibiting data access from the access enable device to the first address area, and a second address area allocated in the memory area of the main memory means and allowing data access from the access enable device to the second address area but inhibiting data from being loaded into the cache memory in the CPU from the second address area, a read buffer memory permitting data stored in the main memory means to be loaded into the read buffer memory and permitting the loaded data to be read in response to a data access request from the CPU or access enable device, and a control portion making control when the CPU or access enable device issues a data access request, in such a manner as to, if data to be accessed exists in the read buffer memory, transfer the data in the read buffer memory to the CPU or access enable device issuing the access request, and if data to be accessed does not exist in the read buffer memory, read from the main memory means data at addresses different from the address under the access request from the CPU or access enable device only in lower bits of fixed length, and load the read data into the read buffer memory while transferring the read data to the CPU or access enable device issuing the access request.

With the arrangement set forth above, the data in the main memory means to which write access is made from the access enable device is always present in the second address area and will never exist in the cache memory. Therefore, consistency of data between the cache memory and the main memory means can be maintained and a need of invalidating the data in the cache memory at the time the access enable device writes data is eliminated. Also, the read buffer memory can be accessed at a higher speed than the main memory means. Accordingly, even a CPU having no snooping function that monitors access to the main memory means from other device than the CPU, i.e., the access enable device, can maintain consistency of data between the cache memory and the main memory means and shorten a data access time.

Preferably, the above main memory control apparatus further comprises a write buffer memory capable of loading therein data requested by the CPU or access enable device to be written into the main memory means, and the control portion loads data under a write request from the CPU or access enable device into the write buffer memory and writes the loaded data into the main memory means.

Also preferably, the above main memory control apparatus further comprises data error checking and correcting means, and the control portion makes control when the CPU or access enable device issues a data access request, in such a manner as to, if data to be accessed does not exist in the read buffer memory, read from the main memory means data at addresses different from the address under the access request from the CPU or access enable device only in lower bits of fixed length, instruct the data error checking and correcting means to perform error checking and correcting of the read data, and then load the read data into the read buffer memory while transferring the read data to the CPU or access enable device issuing the access request.

Data having been subjected to the error checking and correcting is loaded in the read buffer memory, and when the CPU or access enable device issues a write request for the data loaded in the read buffer memory, the loaded data is immediately read. Since errors of the read data have been already corrected, the data access time can be cut down corresponding to omission of an ECC execution time.

Preferably, the above main memory control apparatus further comprises a write buffer memory capable of loading therein data requested by the CPU or access enable device to be written into the main memory means, and the control portion loads data under a write request from the CPU or access enable device into the write buffer memory, produces check bits for the loaded data by the data error checking and correcting means, and writes the produced check bits and the loaded data in the write buffer memory into the main memory means.

In the above main memory control apparatus, preferably, the read buffer memory is provided plural in number.

In the above main memory control apparatus, preferably, the write buffer memory is provided plural in number.

BRIEF DESCRIPTION OF THE DRAWINGS

FIG. 2 shows allocation of memory areas in a main memory unit in one embodiment of the present invention.

DETAILED DESCRIPTION OF THE PREFERRED EMBODIMENT

An embodiment of the present invention will be described hereunder with reference to the accompanying drawings.

Figure 1:
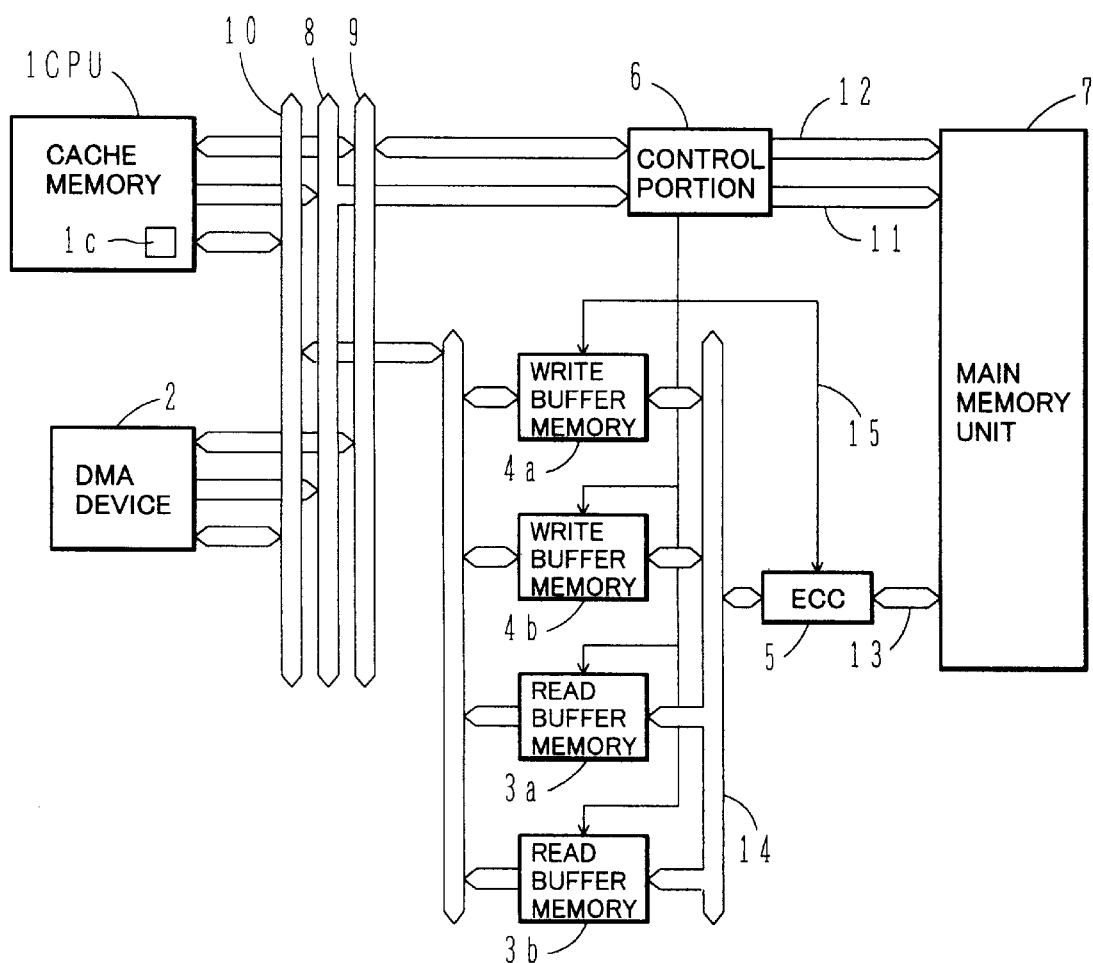
FIG. 1 is a general block diagram of one embodiment of the present invention.

FIG. 1 is a general block diagram of a main memory control apparatus for use in a computer system according to one embodiment of the present invention. In FIG. 1, denoted by reference numeral 1 is a CPU which incorporates a cache memory 1c, but has not a snooping function. Numeral 2 denotes a DMA enable device (access enable device). Numeral 7 denotes a main memory unit (storage). Of an address area of the main memory unit 7, an address area from which data cannot be loaded into the cache memory 1c in the CPU 1 is used by the CPU 1 and the DMA device 2 in common. The remaining address area of the main memory unit 7 is allocated as an address area from which data can be loaded into the cache memory 1c in the CPU 1.

Denoted by 3a, 3b are read buffer memories and 4a, 4b are write buffer memories. Each of these buffer memories has a capacity capable of storing a certain quantity of data and can be accessed at a higher speed than the main memory unit 7. The read buffer memories 3a, 3b and the write buffer memories 4a, 4b each store data at successive addresses in the address area common to both the CPU 1 and the DMA device 2.

While there are provided two read buffer memories and two write buffer memories in the embodiment shown in FIG.

1, the buffer memory of each type may be provided one or more than two. Numeral 5 denotes an ECC (Error Checking and Correcting) executing unit which produces check bits for data written into the main memory unit 7 and performs error checking and correcting of data read from the main memory unit 7.

In the field of semiconductors, micro-processing techniques have been rapidly developed. With progress of the micro-processing techniques, various memory devices have a greater memory capacity for each device, whereas the probability of error bits occurred in data increases because of such external factors as a smaller quantity of accumulated electric charges due to reduction in volume occupied by one memory cell, higher probability in occurrence of minute defects, and application of electric noise incidental to increased speed of operation.

An ECC system is known as a method for improving reliability of data in memory units. The ECC system is designed to produce check bits from data bits by using the extended hamming code, and write the data bits and the check bits in a memory unit. In read operation, it produces a syndrome from the data bits and the check bits both read out of the memory unit, and performs error correcting of 1 bit and error checking of 2 bits by using the syndrome.

The above-mentioned error checking and correcting are executed by the ECC executing unit (data error checking and correcting means) 5.

Denoted by 6 is a control portion which receives addresses and control signals from the CPU 1 and the DMA device 2 through an address bus 8 and a control line 9, respectively, and controls the read buffer memories 3a, 3b, the write buffer memories 4a, 4b, the ECC executing unit 5 and the main memory unit 7 through a memory address bus 11, a memory control line 12 and a buffer control line 15 based on values of the received data.

The CPU 1, the DMA device 2, the read buffer memories 3a, 3b and the write buffer memories 4a, 4b transmit and receive data among them through a data bus 10. Also, the main memory unit 7 and the ECC executing unit 5 transmit and receive data therebetween through a memory data bus 13. Further, the read buffer memories 3a, 3b, the write buffer memories 4a, 4b and the ECC executing unit 5 transmit and receive data among them through a buffer data bus 14.

FIG. 2 shows the allocation of memory areas in the main memory unit 7.

In this embodiment, by allocating memory areas in the main memory unit 7 as shown in FIG. 2, consistency of stored data between the cache memory 1c in the CPU 1 and the main memory unit 7 is maintained.

More specifically, a memory area ranging from the address $0000 to $XXXX is an area (first address area) from which data can be loaded into the cache memory 1c in the CPU 1 and which is exclusively used by the CPU 1. By putting programs to execute the CPU 1 in such an exclusive space, the execution program for the CPU 1 can be loaded into the cache memory 1c and a program execution time can be cut down upon a hit with the cache memory.

A memory area ranging from the address $XXXX+1 to $YYYY is an area (second address area) from which data cannot be loaded into the cache memory 1c in the CPU 1 and which is used by both the CPU 1 and the DMA device 2 in common. The DMA device 2 is allowed to access to the main memory unit 7 only in the second address area. Therefore, the data stored in the main memory unit 7 and loaded into the cache memory 1c in the CPU 1 will never be rewritten by the DMA device 2 to ensure that consistency of data between the cache memory 1c in the CPU 1 and the main memory unit 7 is maintained.

On the other hand, data in the area ranging from the address $XXXX+1 to $YYYY will never exist in the cache memory 1c. Accordingly, when referring to data in the area ranging from the address $XXXX+1 to $YYYY, the CPU 1 must directly access to the main memory unit 7. This direct access requires a longer time than the case of accessing to the cache memory 1c.

In the present invention, the read buffer memories 3a, 3b and the write buffer memories 4a, 4b are employed to cut down an access time of the CPU 1 and the DMA device 2 to the memory area from which data cannot be loaded into the cache memory 1c.

Figure 3:
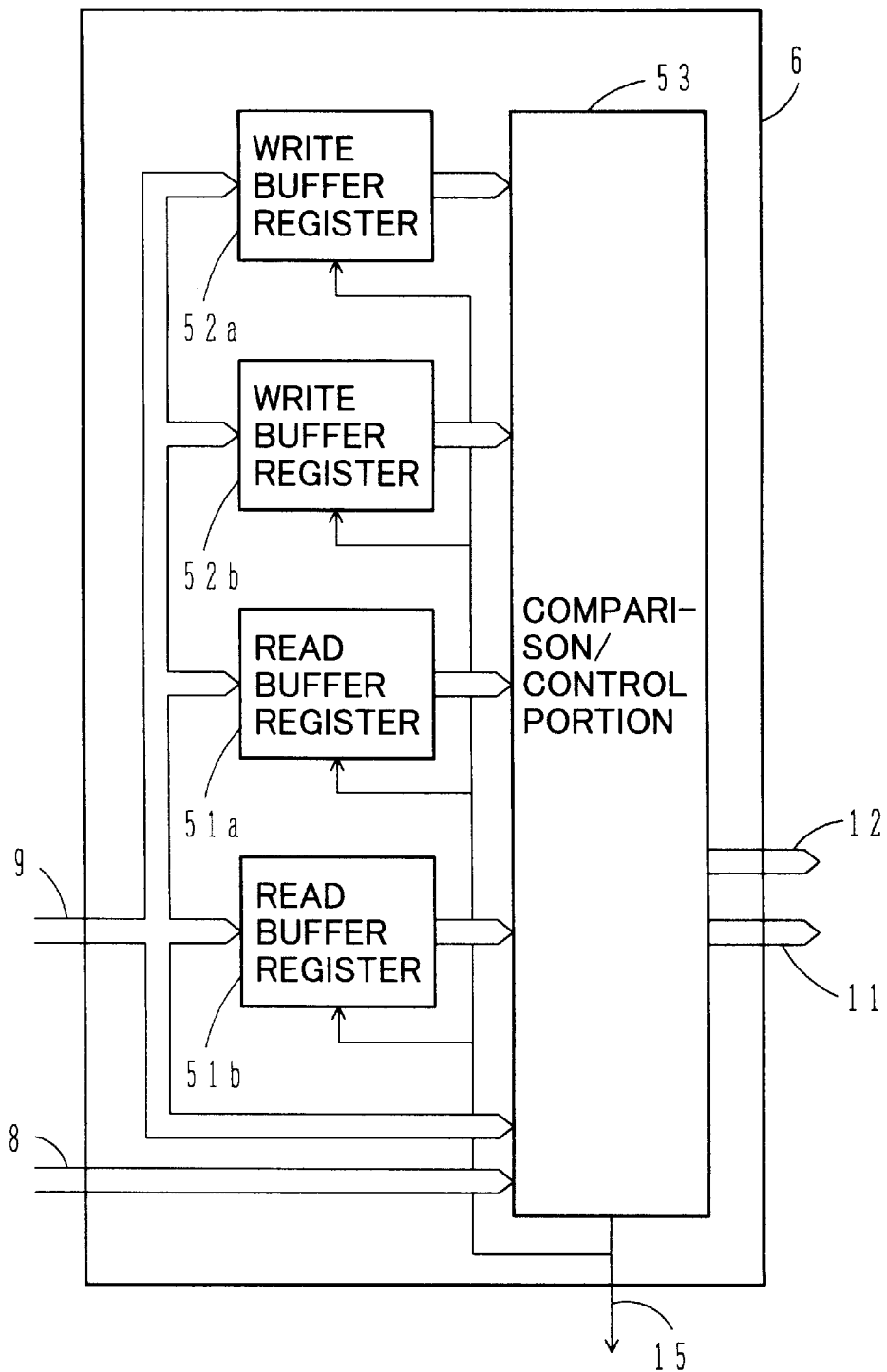
FIG. 3 is a block diagram of detailed configuration of a control portion shown in FIG. 1.

FIG. 3 shows a detailed configuration of the control portion 6. In FIG. 3, denoted by 51a, 51b are read buffer address registers for holding addresses of data loaded in the read buffer memories 3a, 3b, information indicating effectiveness of the contents in the read buffer memories 3a, 3b, and information about the history of use of the read buffer memories 3a, 3b.

Denoted by 52a, 52b are write buffer address registers for holding addresses of data loaded in the write buffer memories 4a, 4b, information indicating effectiveness of the contents in the write buffer memories 4a, 4b, and information about the history of use of the write buffer memories 4a, 4b.

A comparison/control portion 53 compares the addresses held in the read buffer address registers 51a, 51b and the write buffer address registers 52a, 52b with addresses from the CPU 1 and the DMA device 2. Also, the comparison/control portion 53 controls the read buffer memories 3a, 3b, the write buffer memories 4a, 4b, the ECC executing unit 5 and the main memory unit 7 in accordance with the compared results, the control signals from the CPU 1 and the DMA device 2, and the information indicating effectiveness of the contents in the buffer memories.

Figure 4:
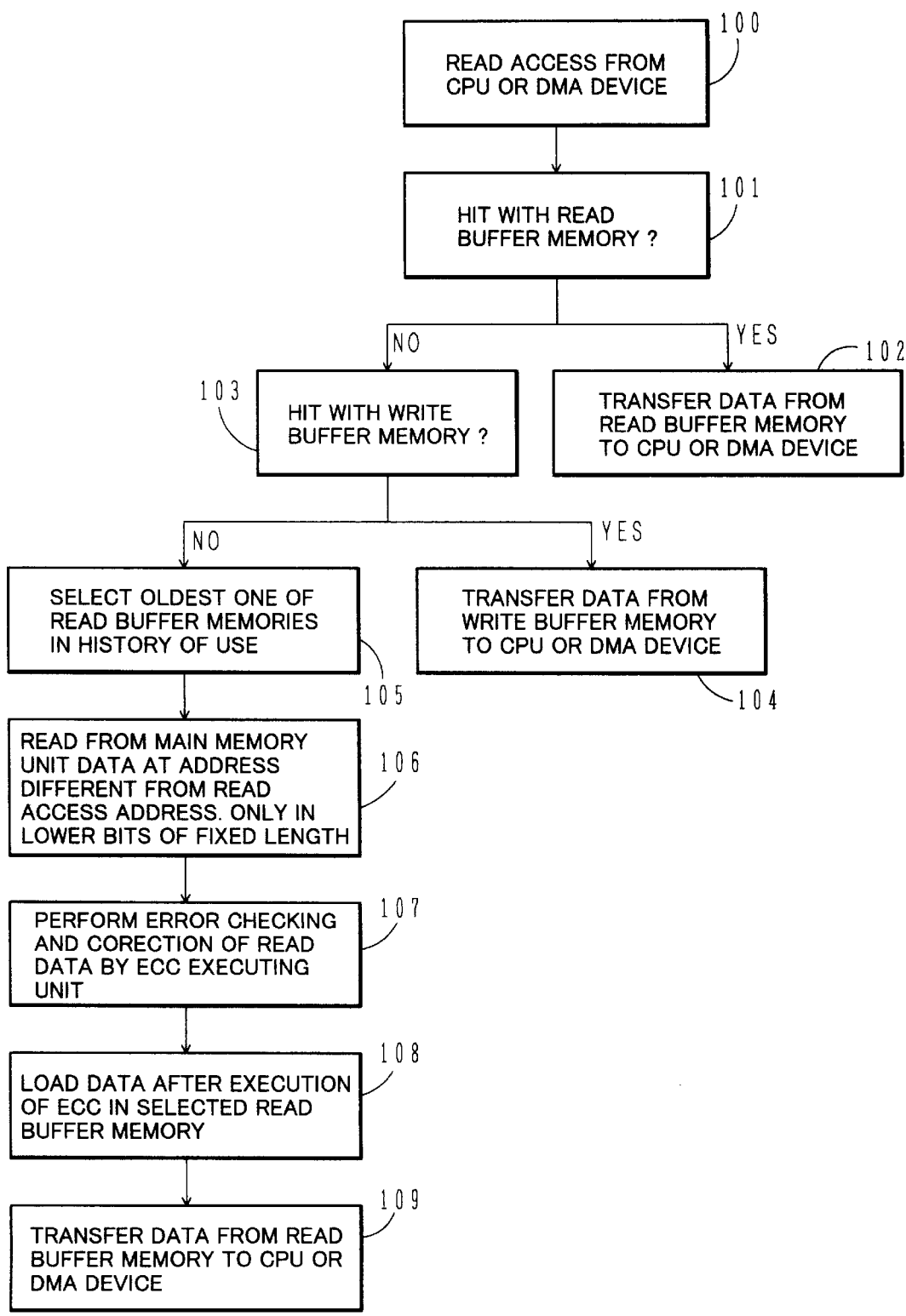
FIG. 4 is a flowchart of operation in read access of a CPU or DMA device to the main memory unit.

FIG. 4 is a flowchart of operation in read access of the CPU 1 or the DMA device 2 to the main memory unit 2 by using the main memory control apparatus according to one embodiment of the present invention.

In step 100 of FIG. 4, the comparison/control portion 53 compares an access address with data in the read buffer address registers based on the read access address from the CPU 1 or the DMA device 2. Then, in step 101, it determines whether data at the access address is present or not in any of the read buffer memories. If the data at the access address exists in the read buffer memory, i.e., if there occurs a hit with the read buffer memory, then it progresses to step 102 where the data is immediately transferred from the read buffer memory to the CPU 1 or the DMA device 2.

If a hit with any of the read buffer memories does not occur in step 101, then the comparison/control portion 53 progresses to step 103 to determine whether the data at the access address is present or not in any of the write buffer memories. If there occurs a hit with the write buffer memory, then it progresses to step 104. In step 104, the data is immediately transferred from the write buffer memory to the CPU 1 or the DMA device 2.

If a hit with any of the write buffer memories does not occur in step 103, then the comparison/control portion 53 progresses to step 105 where it selects the oldest one of the read buffer memories in the history of use. Next, in step 106, the comparison/control portion 53 reads from the main memory unit 7 data at addresses different from the read access address only in lower bits of fixed length.

Subsequently, in step 107, the comparison/control portion 53 instructs the ECC executing unit 5 to perform error checking and correcting of the data read in step 106. Then, in step 108, the comparison/control portion 53 loads the data after the execution of ECC in the selected read buffer memory. After that, the comparison/control portion 53 transfers the data, which has been loaded in the read buffer memory in step 108, to the CPU 1 or the DMA device 2 therefrom.

Because the read buffer memories 3a, 3b can be accessed at a higher speed than the main memory unit 7, the data access time can be cut down correspondingly. Also, because the read buffer memories 3a, 3b load therein the data on which the ECC executing unit 5 has performed the error checking and correcting, a need of executing the ECC again is eliminated and an ECC execution time can be cut out.

Figure 5:
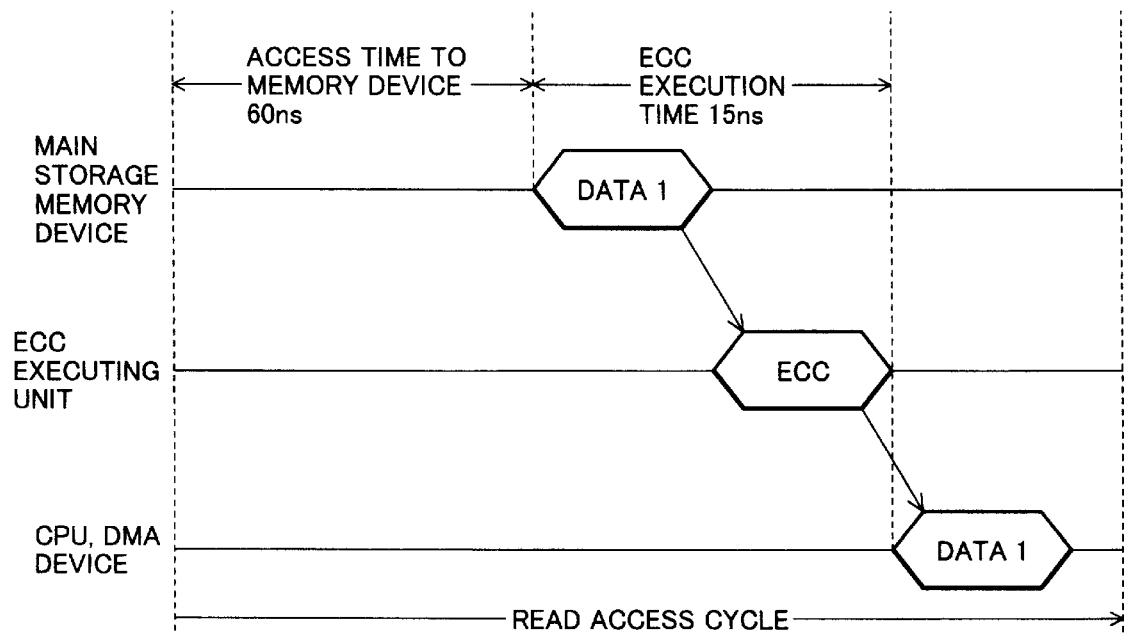
FIG. 5 is a time chart showing a read access cycle of the CPU or DMA device in the absence of a read buffer memory.
Figure 6:
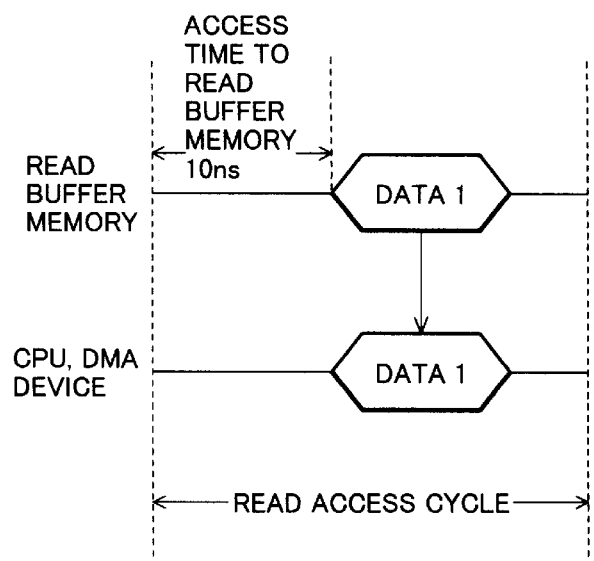
FIG. 6 is a time chart showing a read access cycle of the CPU or DMA device in the presence of the read buffer memory.

FIG. 5 is a time chart showing a read access cycle corresponding to the prior art, i.e., a read access cycle of the CPU 1 or the DMA device 2 in the absence of a read buffer memory. FIG. 6 is a time chart showing a read access cycle in this embodiment, i.e., a read access cycle of the CPU 1 or the DMA device 2 in the presence of the read buffer memory.

In FIG. 5, the CPU 1 or the DMA device 2 makes a read access directly to the main memory unit 7. Therefore, an access time to the main memory unit 7 is given by the sum of a read access time to the main memory unit 7 and an ECC execution time.

By contrast, in FIG. 6, the CPU 1 or the DMA device 2 accesses to the read buffer memory 3a or 3b. Therefore, an access time to the read buffer memory 3a or 3b is equivalent to an access time to the main memory unit 7.

Assuming that the access time to the main memory unit 7 is 60 ns, the access time to the read buffer memory 3a or 3b is 10 ns and the ECC execution time is 15 ns, it will be apparent from comparing FIGS. 5 and 6 that the data access time in read access can be cut down 65 ns by this embodiment.

Further, data at successive addresses are loaded in each of the read buffer memories 3a, 3b. However, the probability of a hit with any of the read buffer memories 3a, 3b is high because the CPU 1 has localization in time and space when referring to data and access from the DMA device 2 to the main memory unit 7 is made to successive addresses.

As described above, if the data at the access address is not present in the read buffer memories 3a, 3b, then the comparison/control portion 53 determines whether the data at the access address exists in the write buffer memories 4a, 4b or not. If the data at the access address exists in any of the write buffer memories 4a, 4b, then the data is immediately transferred to the CPU 1 or the DMA device 2 from the write buffer memory 4a or 4b. Since the write buffer memories 4a, 4b load therein the latest data, there is no problem in consistency of data.

Further, since the write buffer memories 4a, 4b can be accessed at a higher speed than the main memory unit 7, the data access time can be cut down correspondingly.

Figure 7:
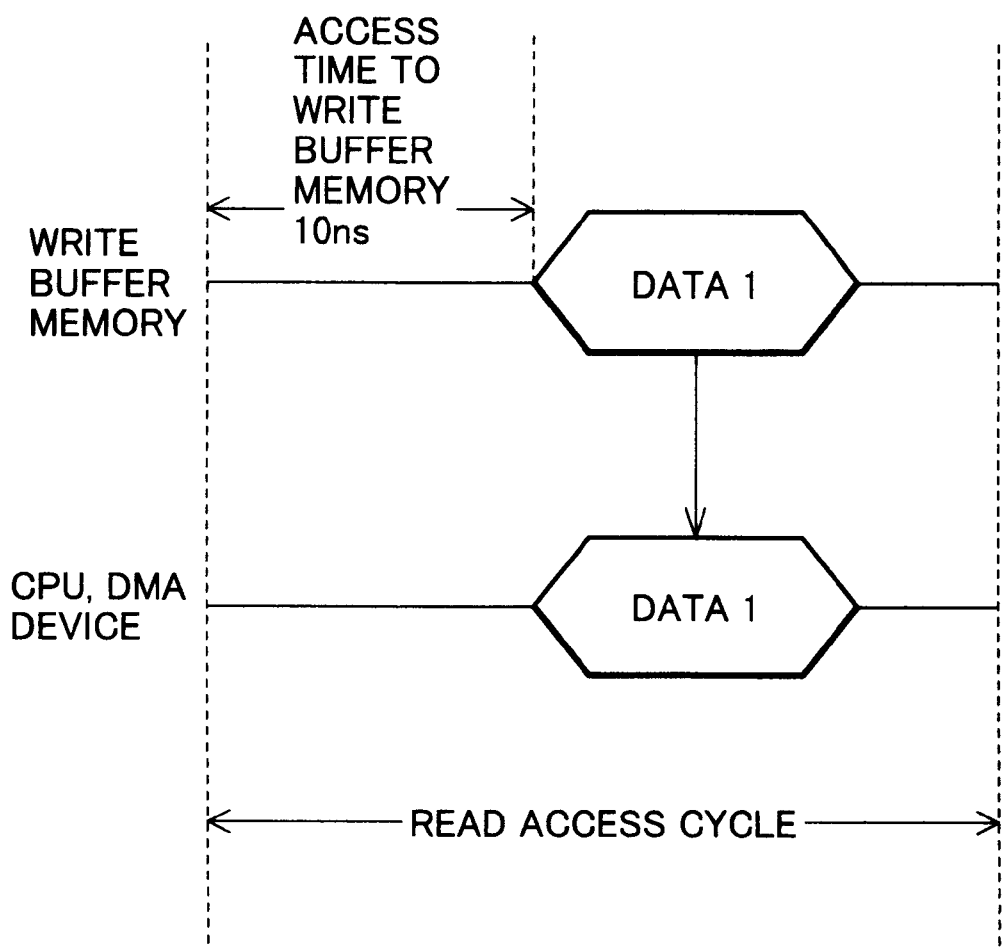
FIG. 7 is a time chart showing a read access cycle of the CPU or DMA device upon a hit with a write buffer memory.

FIG. 7 is a time chart showing a read access cycle of the CPU 1 or the DMA device 2 upon a hit with the write buffer memory. In FIG. 7, the CPU 1 or the DMA device 2 accesses to the write buffer memory 4a or 4b and, therefore, the data access time is given by an access time to the write buffer memory 4a or 4b.

Assuming that the access time to the main memory unit 7 is 60 ns, the access time to the write buffer memory 4a or 4b is 10 ns and the ECC execution time is 15 ns, it will be apparent from comparing FIGS. 5 and 7 that the data access time in read access can cut down 65 ns by this embodiment.

As described above, if the data at the access address is not present in the write buffer memories 4a, 4b, then the comparison/control portion 53 selects the oldest one of the read buffer memories 3a, 3b in the history of use.

Subsequently, the comparison/control portion 53 reads from the main memory unit 7 data at addresses different from the read access address only in lower bits of fixed length, instructs the ECC executing unit 5 to perform error checking and correcting of the read data, and then loads the read access data in the selected read buffer memory while transferring it to the CPU 1 or the DMA device 2.

On that occasion, the read access to the main memory unit 7 is made to successive addresses. Since a DRAM or the like has a burst mode enabling successive accesses to be executed at a high speed, the data access time can be cut down to be shorter than the case of executing one cycle of read access several times by using the burst mode, when the main memory unit 7 comprises a DRAM.

Figure 8:
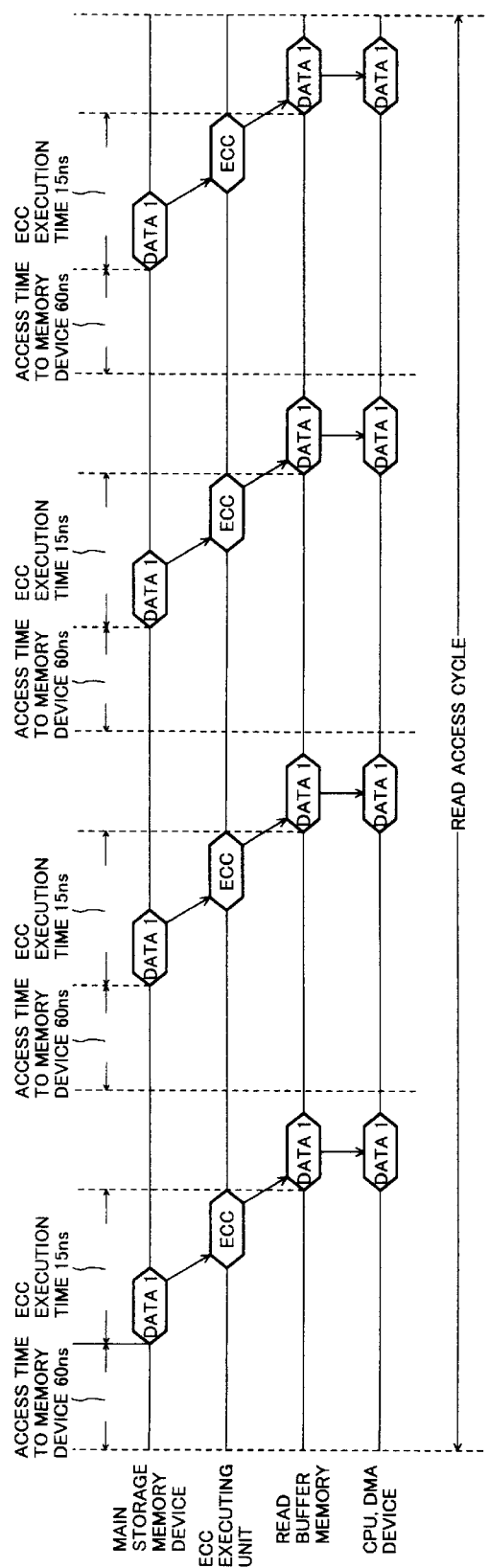
FIG. 8 is a time chart showing a read access cycle of the CPU or DMA device upon a miss hit with any read buffer memory or any write buffer memory when the burst mode is not employed.
Figure 9:
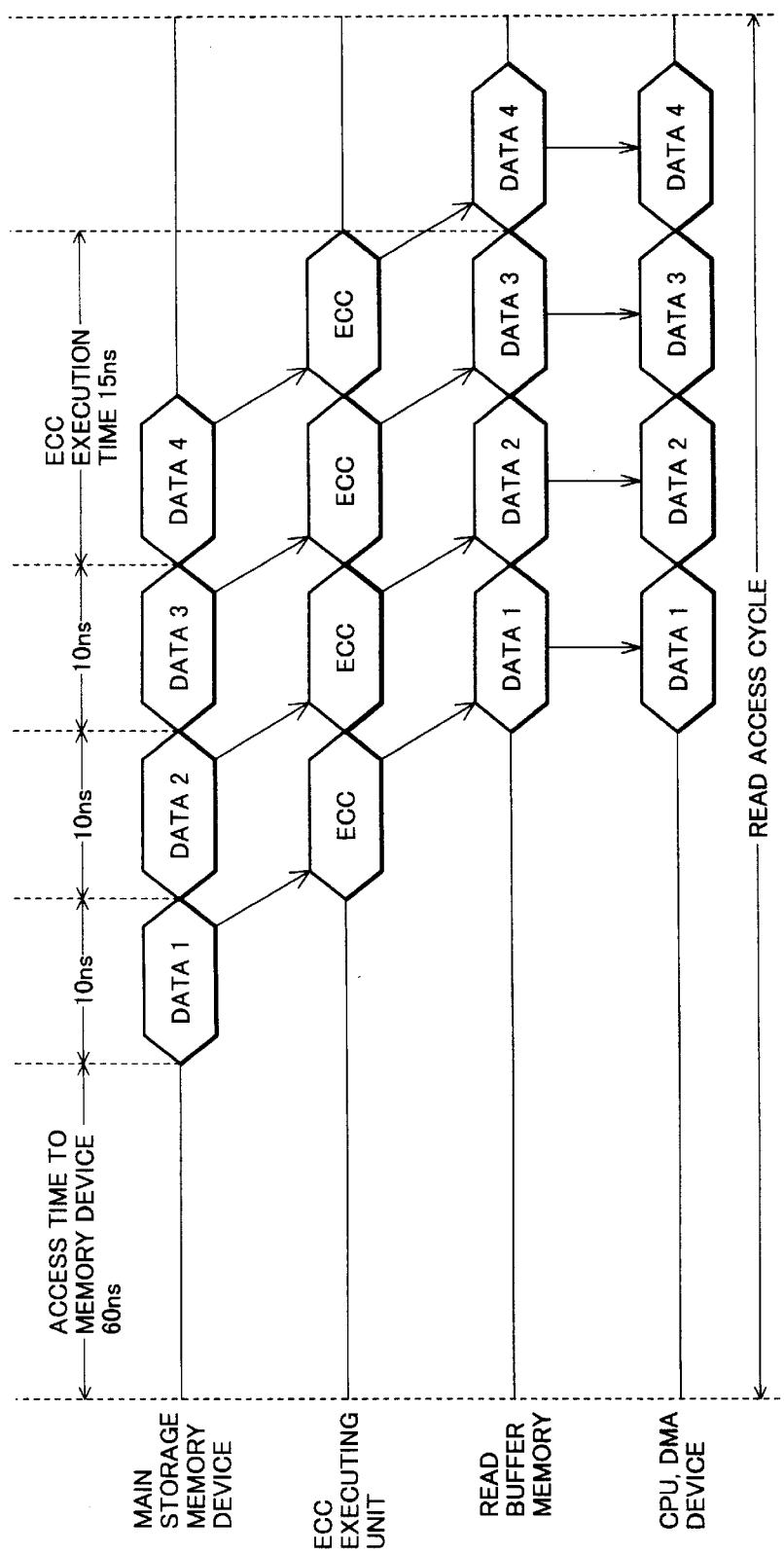
FIG. 9 is a time chart showing a read access cycle of the CPU or DMA device upon a miss hit with any read buffer memory or any write buffer memory when the burst mode is employed.

FIG. 8 is a time chart showing a read access cycle of the CPU 1 or DMA device 2 upon a miss hit with any read buffer memory or any write buffer memory when the burst mode is not employed. FIG. 9 is a time chart showing a read access cycle of the CPU 1 or the DMA device 2 upon a miss hit with any read buffer memory or any write buffer memory when the burst mode is employed.

In FIG. 8, the read access cycle shown in FIG. 5 is repeated four times. In FIG. 9, by using the burst mode, data is read successively at certain intervals. Assuming that the read access time to the main memory unit 7 is 60 ns, the data read interval according to the burst mode is 10 ns and the ECC execution time is 15 ns, it will be apparent from comparing FIGS. 8 and 9 that the data access time in read access upon a miss hit with any read buffer memory or any write buffer memory can be cut down 195 ns by using the burst mode.

Figure 10:
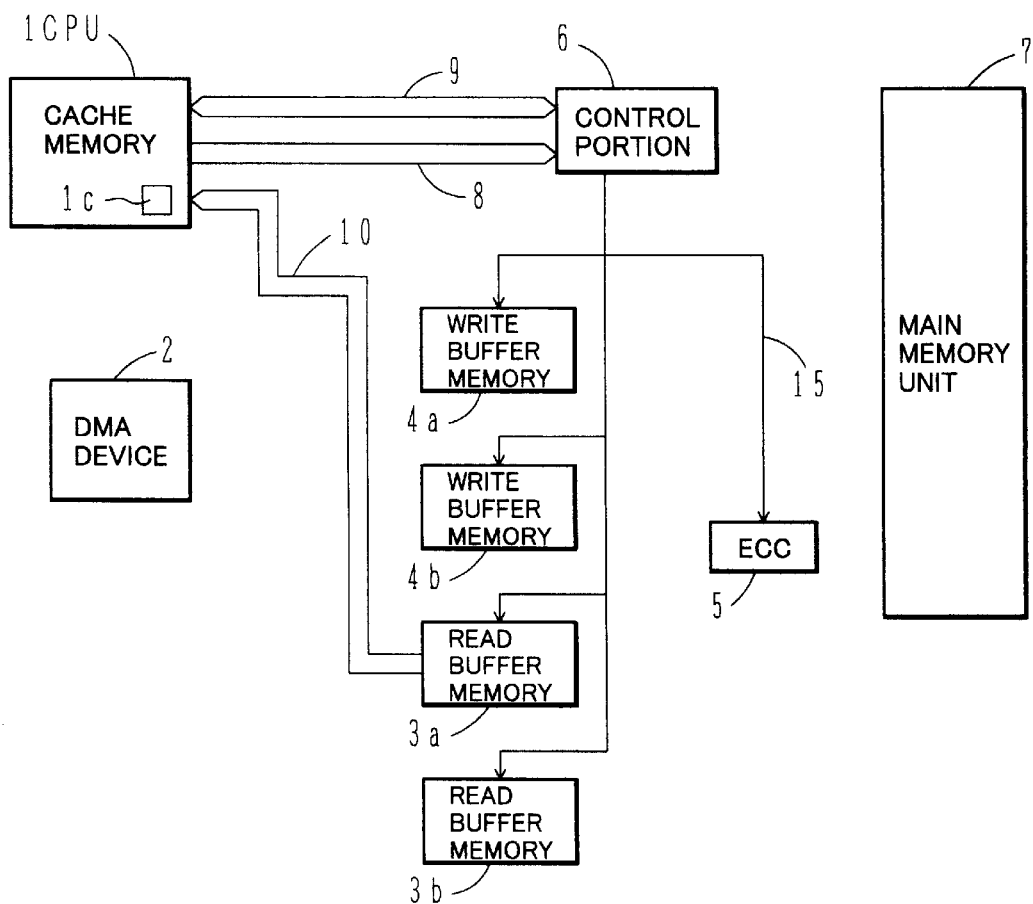
FIG. 10 is a block diagram showing operation executed when read access data for the CPU exists in one read buffer memory.
Figure 11:
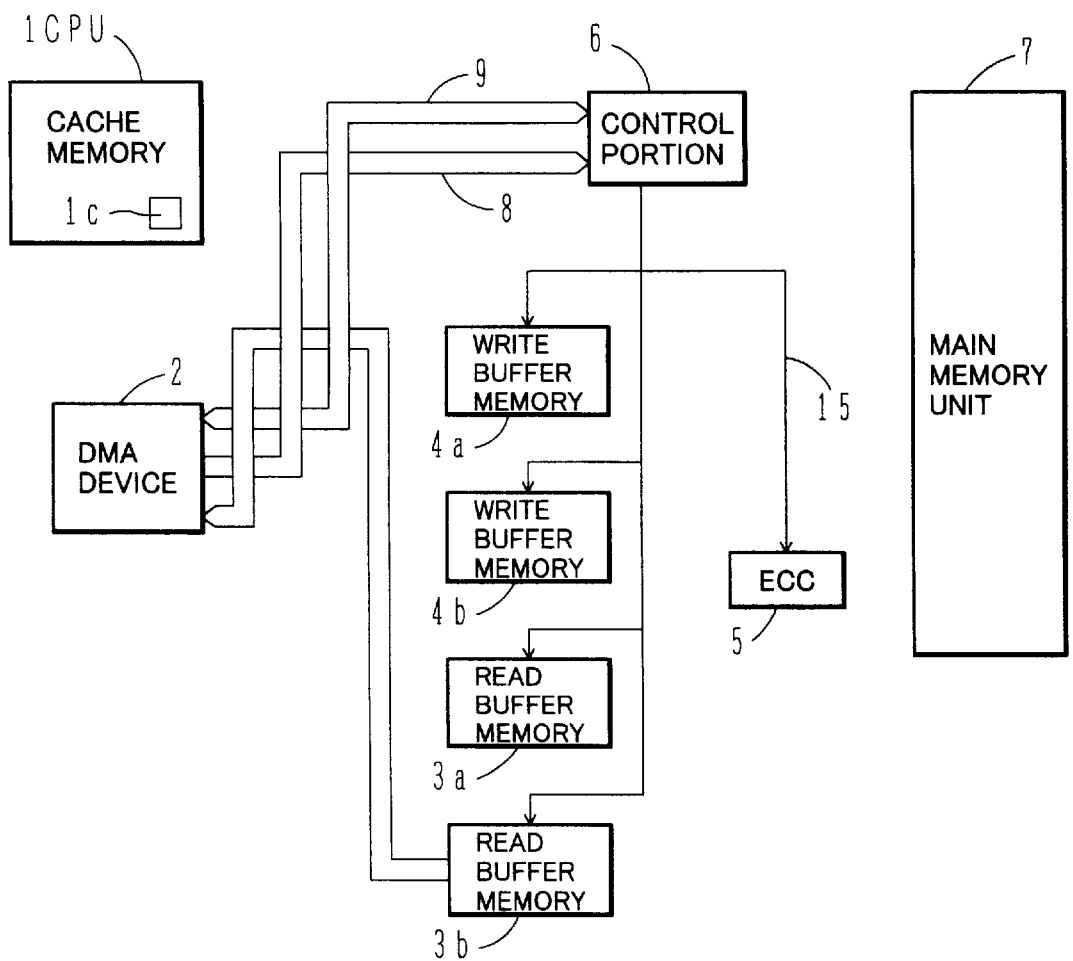
FIG. 11 is a block diagram showing operation executed when read access data for the DMA device exists in the other read buffer memory.

FIG. 10 shows operation executed when read access data for the CPU 1 exists in the read buffer memory 3a, and FIG. 11 shows operation executed when read access data for the DMA device 2 exists in the read buffer memory 3b.

Supposing the case that read access from the CPU 1 and read access from the DMA device 2 are alternately made to successive addresses in different areas from each other, if only one read buffer memory is provided, there would occur a miss hit with the read buffer memory for each read access. In other words, whenever read access is made, the comparison/control portion 53 would have to read from the main memory unit 7 data at addresses different from the read access address only in lower bits of fixed length and then load it in the read buffer memory.

Thus, in such a case, the same data is read several times alternately and the effect of using the read buffer memory will be in vain.

On the contrary, by providing two or more read buffer memories as with the illustrated embodiment, data at addresses different from the read access address from the CPU 1 only in lower bits of fixed length and data at addresses different from the read access address from the DMA device 2 only in lower bits of fixed length can be loaded into different read buffer memories from each other, it is possible to alternately perform the operation shown in FIG. 10 and the operation shown in FIG. 11. As a result, the data access time can be cut down.

Figure 12:
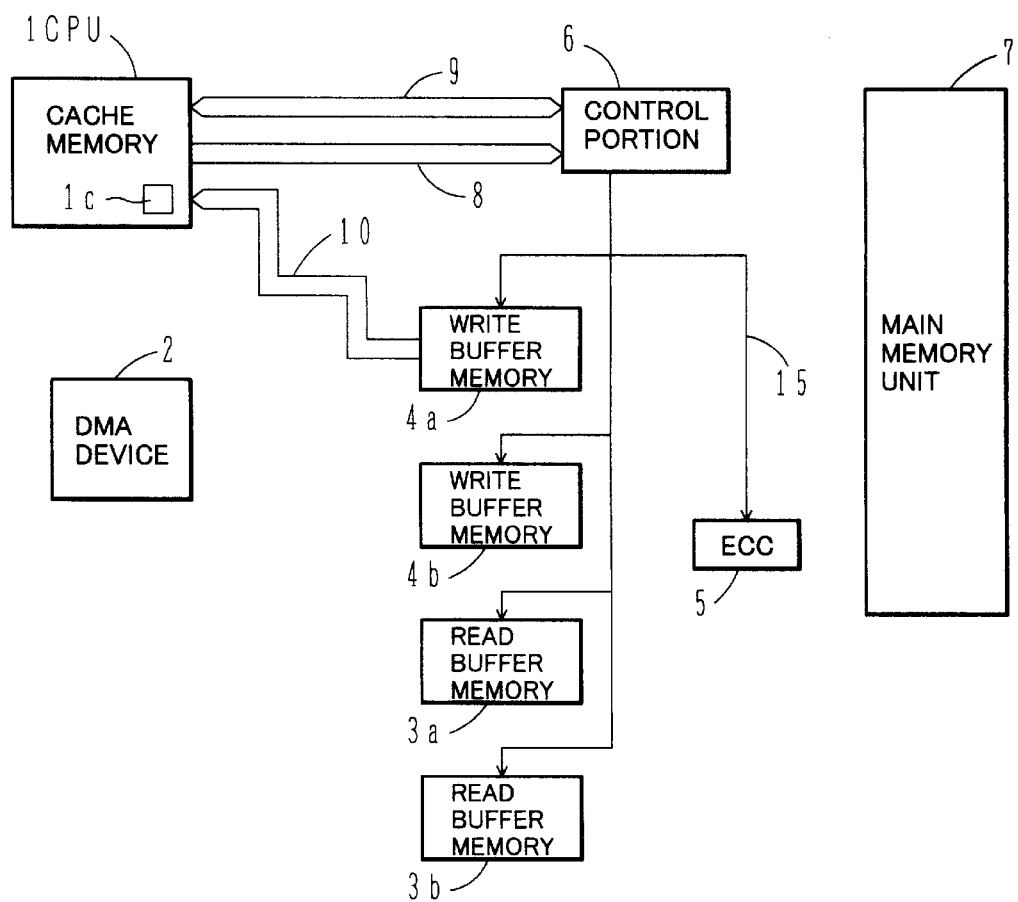
FIG. 12 is a block diagram showing operation executed when read access data for the CPU exists in one write buffer memory.
Figure 13:
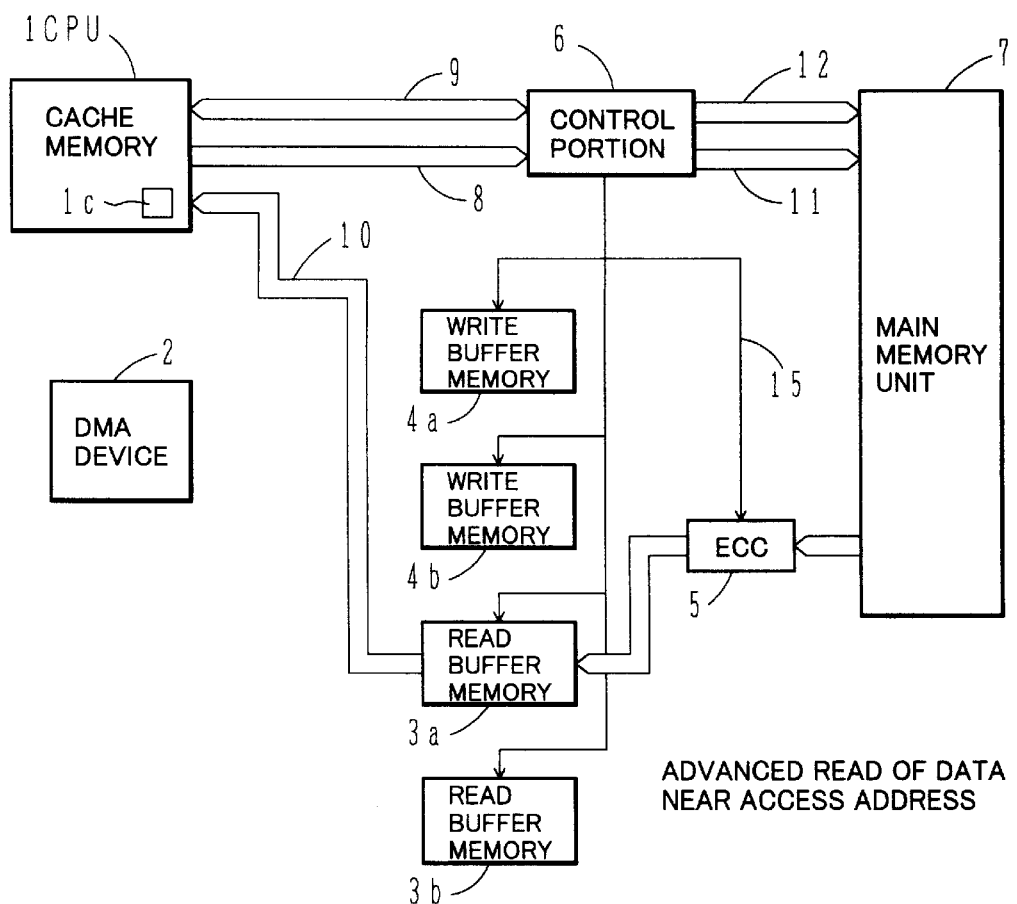
FIG. 13 is a block diagram showing operation executed when read access data for the CPU exists in neither any read buffer memory nor any write buffer memory.

FIG. 12 shows operation executed when read access data for the CPU 1 exists in the write buffer memory 4a. FIG. 13 shows operation executed when read access data for the CPU 1 exists in any of the read buffer memories 3a, 3b and the write buffer memories 4a, 4b.

In FIG. 13, the read buffer memory 3a is selected as the oldest read buffer memory in the history of use, and the data at addresses different from the read access address from the CPU 1 only in lower bits of fixed length, which has been read out of the main memory unit 7 and subjected to the error checking and correcting by the ECC executing unit 5, is loaded in the selected read buffer memory 3a.

Figure 14:
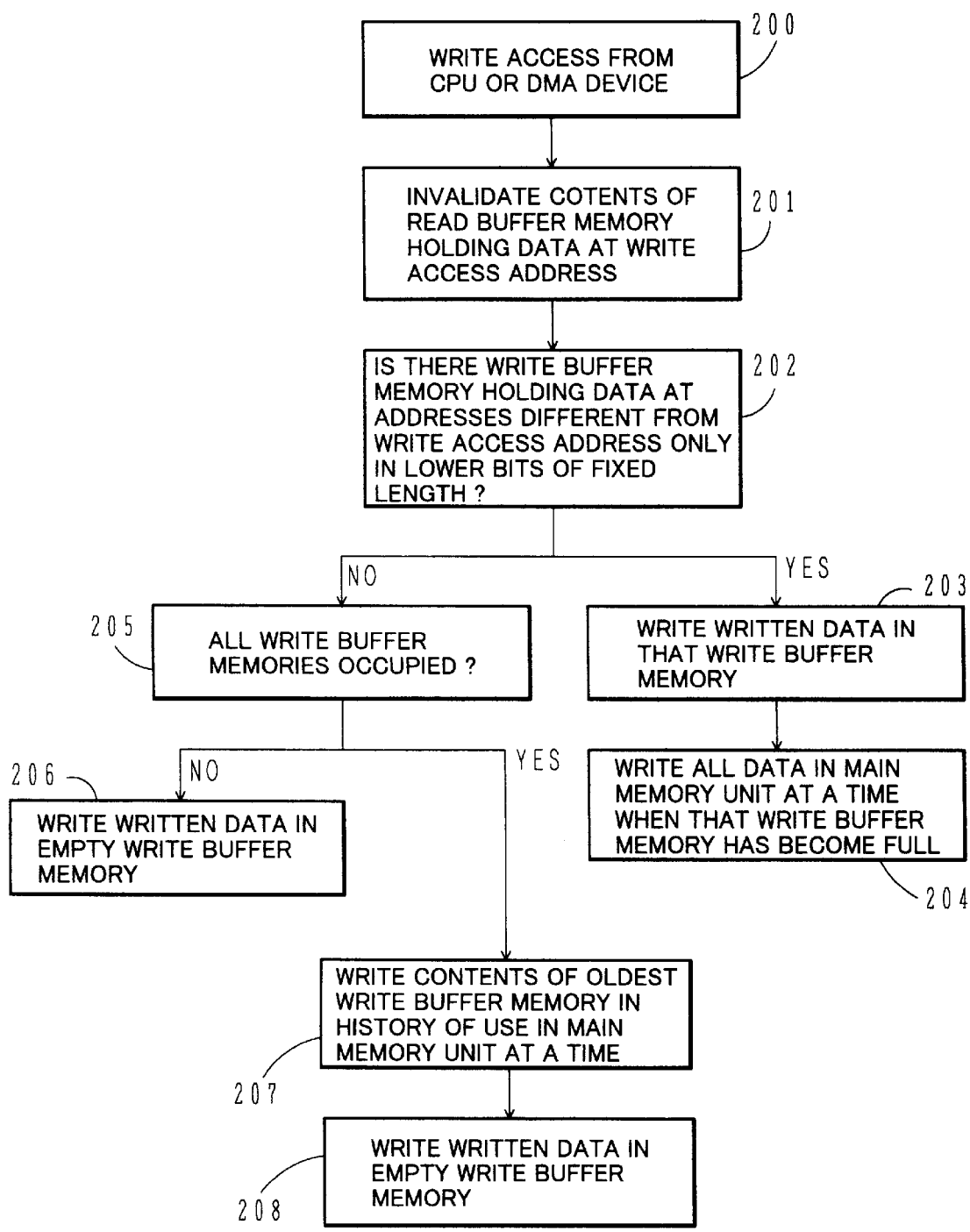
FIG. 14 is a flowchart of operation in write access of the CPU or DMA device to the main memory unit.

FIG. 14 is a flowchart of operation in write access of the CPU 1 or the DMA device 2 to the main memory unit 7 by using the main memory control apparatus according to this embodiment.

In step 200 of FIG. 14, the comparison/control portion 53 determines whether or not there is a request for write access from the CPU 1 or the DMA device 2. Then, in step 201, it determines whether data at a write access address is present or not in any of the read buffer memories. If the data at the write access address exists in the read buffer memory, then it invalidates that data in the read buffer memory 3 because consistency between written data from the CPU 1 or the DMA device 2 and the data at the write access address in the read buffer memory 3 will be lost.

Next, in step 202, the comparison/control portion 53 confirms whether or not there is a write buffer memory holding data at addresses different from the write access address only in lower bits of fixed length. If such a write buffer memory exists, then it progresses to step 203 to write the written data from the CPU 1 or the DMA device 2 into that write buffer memory. Subsequently, in step 204, when data is stored in that write buffer memory up to its full capacity, the stored data is written into the main memory unit 7 at a time.

If the write buffer memory holding the data at addresses different from the write access address only in lower bits of fixed length does not exist in step 202, then the process of the comparison/control portion 53 progresses to step 205 where it determines whether all the write buffer memories are occupied or not. If there is an empty write buffer memory, then it writes the written data into the empty write buffer memory in step 206.

If all the write buffer memories are occupied in step 205, then the process of the comparison/control portion 53 progresses to step 207 where it writes the data, which is stored in the oldest write buffer memory in the history of use, into the main memory unit 7 at a time. After that, in step 208, it writes the written data into the write buffer memory which has become empty by writing of the stored data into the main memory unit 7.

Since the write buffer memory can be accessed at a higher speed than the main memory unit 7, the data access time can be cut down correspondingly.

Figure 15:
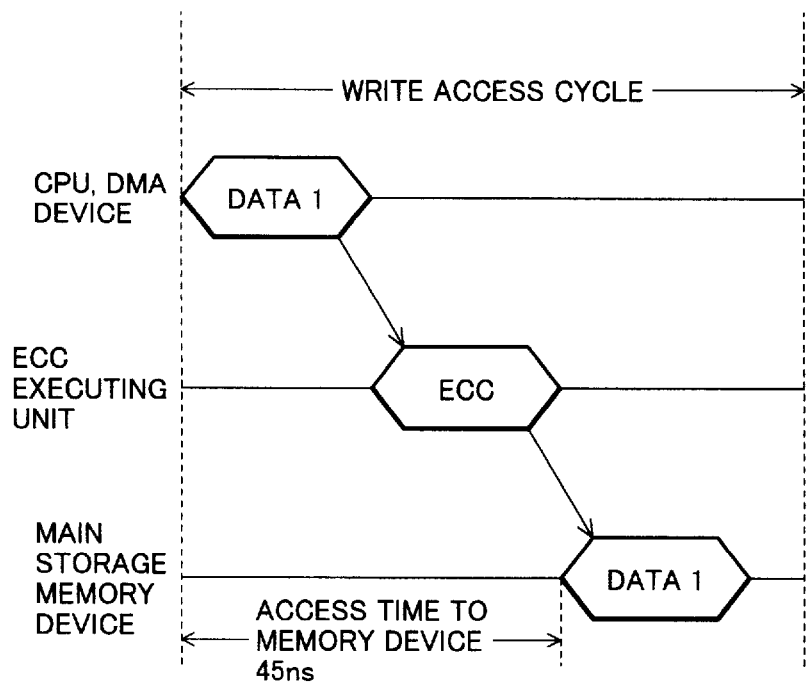
FIG. 15 is a time chart showing a write access cycle of the CPU or DMA device in the absence of the write buffer memory.
Figure 16:
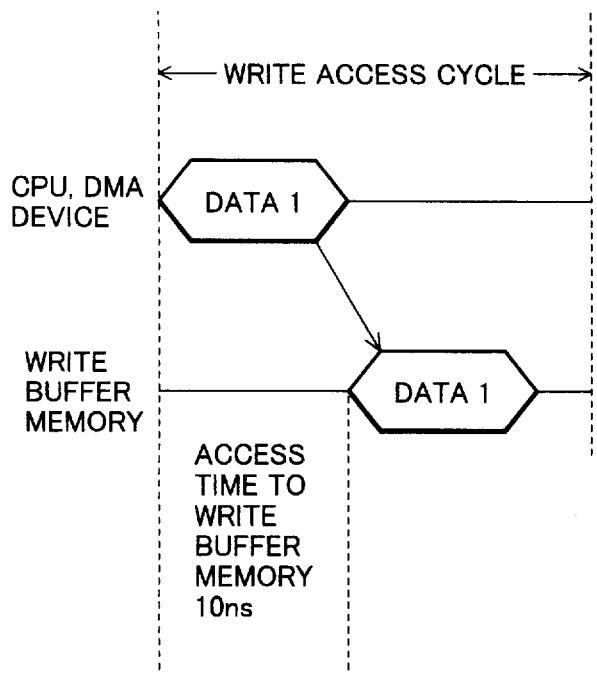
FIG. 16 is a time chart showing a write access cycle of the CPU or DMA device in the presence of the write buffer memory.

FIG. 15 is a time chart showing a write access cycle of the CPU 1 or the DMA device 2 in the absence of the write buffer memory. FIG. 16 is a time chart showing a write access cycle of the CPU 1 or the DMA device 2 in the presence of the write buffer memory.

In FIG. 15, the CPU 1 or the DMA device 2 makes a write access directly to the main memory unit 7. Therefore, the access time is given by the sum of a read access time to the main memory unit 7 and an ECC execution time. By contrast, in FIG. 16, the CPU 1 or the DMA device 2 accesses to the write buffer memory. Therefore, the data access time is given by an access time to the write buffer memory.

Assuming that the sum of the write access time to the main memory unit 7 and the ECC execution time is 45 ns and the access time to the write buffer memory is 10 ns, it will be apparent from comparing FIGS. 15 and 16 that the data access time in write access can be cut down 30 ns by this embodiment.

As described above, when the write buffer memory has become full with the written data from the CPU 1 or the DMA device 2, the contents of the write buffer memory are written into the main memory unit 7 at a time. On that occasion, the write access to the main memory unit 7 is sometimes made to successive addresses. Since a DRAM or the like has a burst mode enabling successive accesses to be executed at a high speed, the data access time can be cut down to be shorter than the case of executing one cycle of write access several times by using the burst mode.

Figure 17:
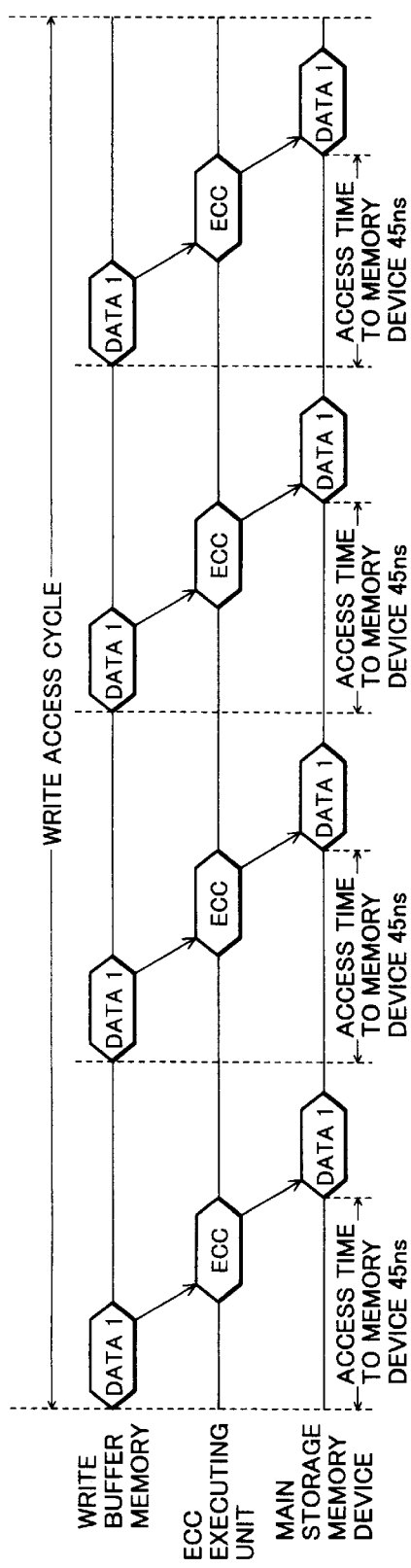
FIG. 17 is a time chart showing a write access cycle from the write buffer memory to the main memory unit when the burst mode is not employed.
Figure 18:
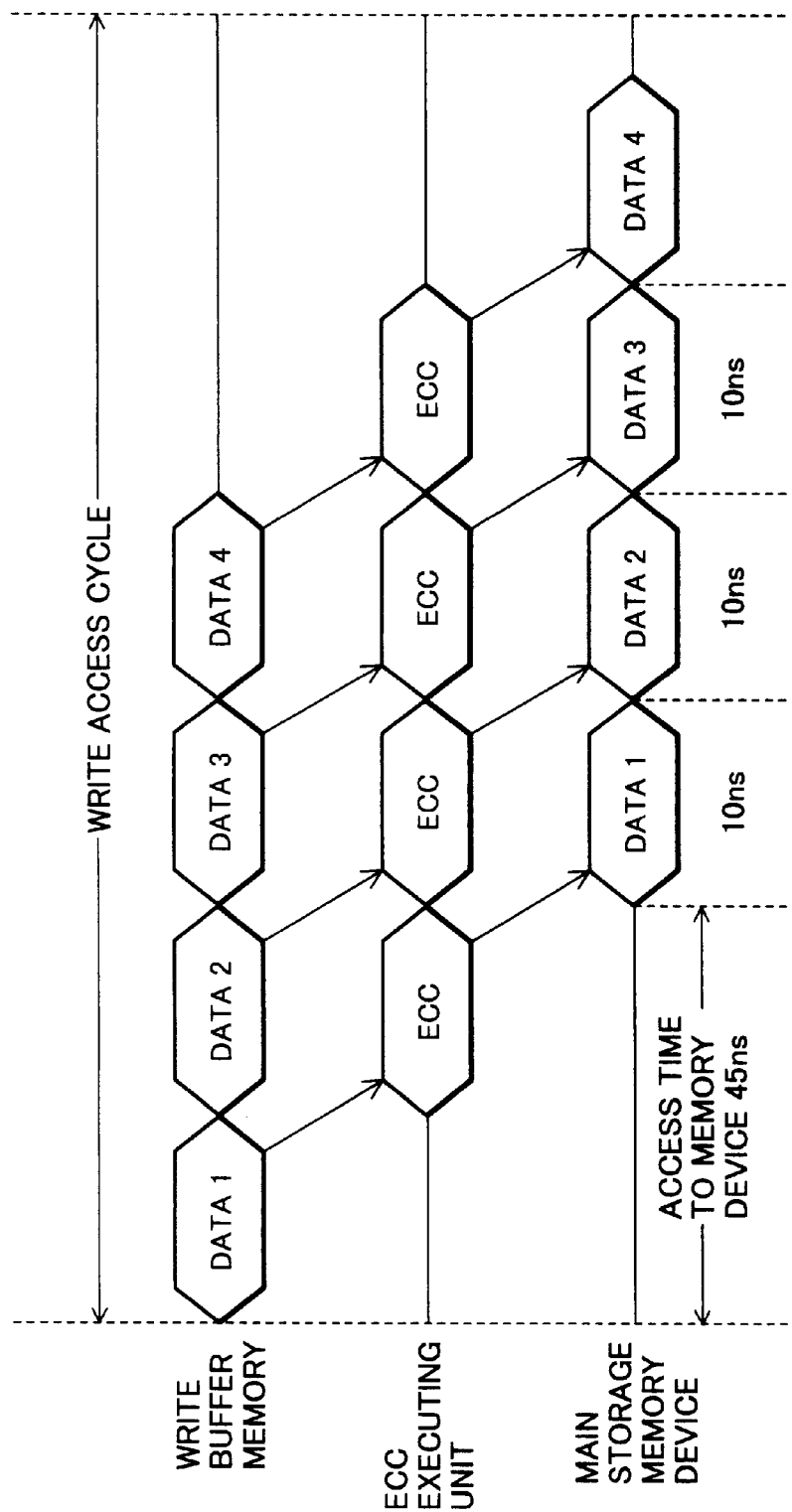
FIG. 18 is a time chart showing a write access cycle from the write buffer memory to the main memory unit when the burst mode is employed.

FIG. 17 is a time chart showing a write access cycle from the write buffer memory to the main memory unit 7 when the burst mode is not employed. FIG. 18 is a time chart showing a write access cycle from the write buffer memory to the main memory unit 7 when the burst mode is employed.

In FIG. 17, the write access cycle shown in FIG. 15 is repeated four times.

On the other hand, in FIG. 18, by using the burst mode, data is written successively at certain intervals. Assuming that the sum of the write access time to the main memory unit 7 and the ECC execution time is 45 ns and the data write interval according to the burst mode is 10 ns, it will be apparent from comparing FIGS. 17 and 18 that the data access time in write access required when the write buffer memory has become full can be cut down 105 ns by this embodiment.

The probability that the addresses of the data stored in the write buffer memory continue successively is high because the CPU 1 has localization in time and space when writing data and access from the DMA device 2 to the main memory unit 7 i s made to successive addresses.

Further, as described above, if the write buffer memory holding the data at addresses different from the write access address only in lower bits of fixed length does not exist, then the comparison/control portion 53 determines whether all the write buffer memories are occupied or not.

If there is an empty write buffer memory, then the comparison/control portion 53 writes the written data into the empty write buffer memory. Since the write buffer memory can be accessed at a higher speed than the main memory unit 7, the data access time can be cut down correspondingly.

If all the write buffer memories are occupied, this means that there is no write buffer memory into which the written data from the CPU 1 or the DMA device 2 is to be written. Accordingly, the comparison/control portion 53 writes the contents of the oldest write buffer memory in the history of use into the main memory unit 7 at a time, thereby making that write buffer memory empty, and then writes the written data into the empty write buffer memory.

Figure 19:
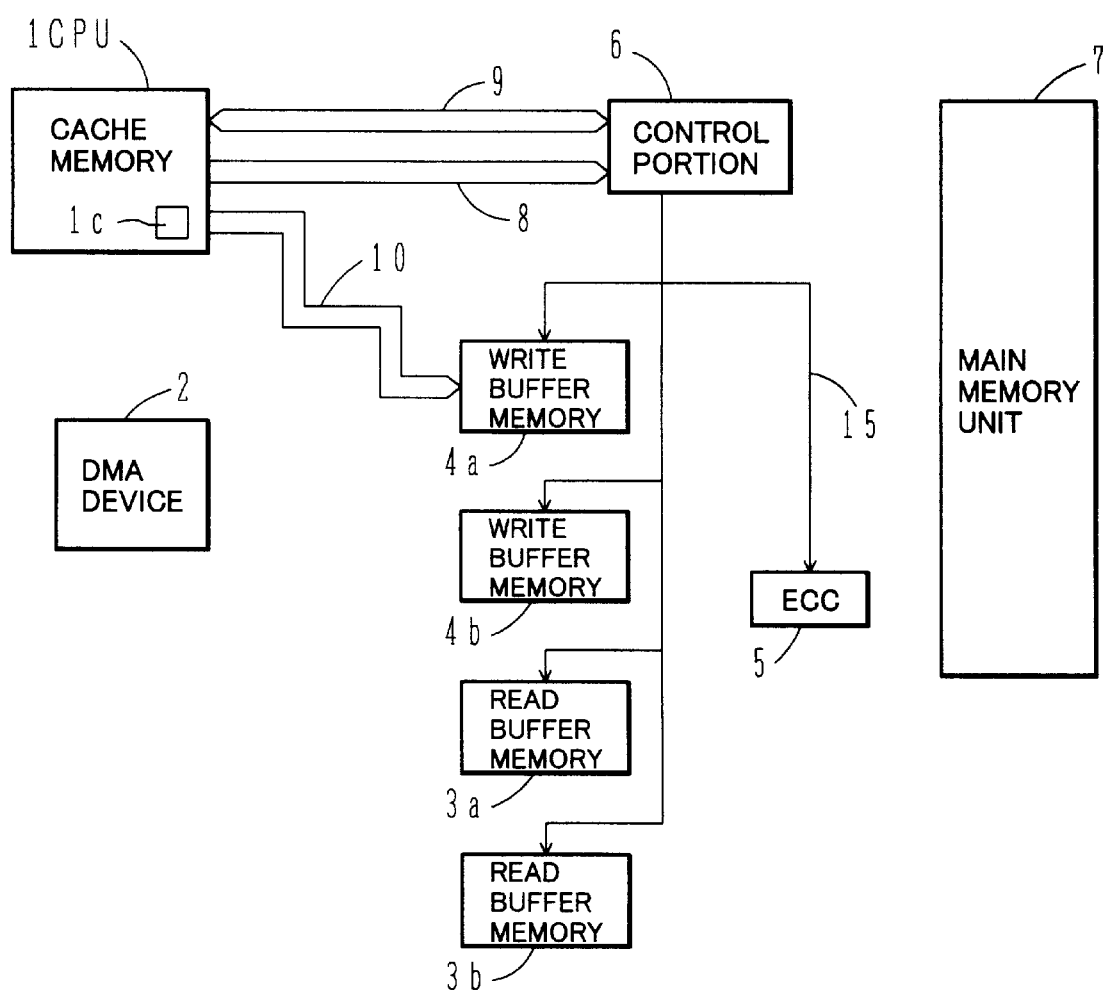
FIG. 19 is a block diagram showing write operation from the CPU to one write buffer memory.
Figure 20:
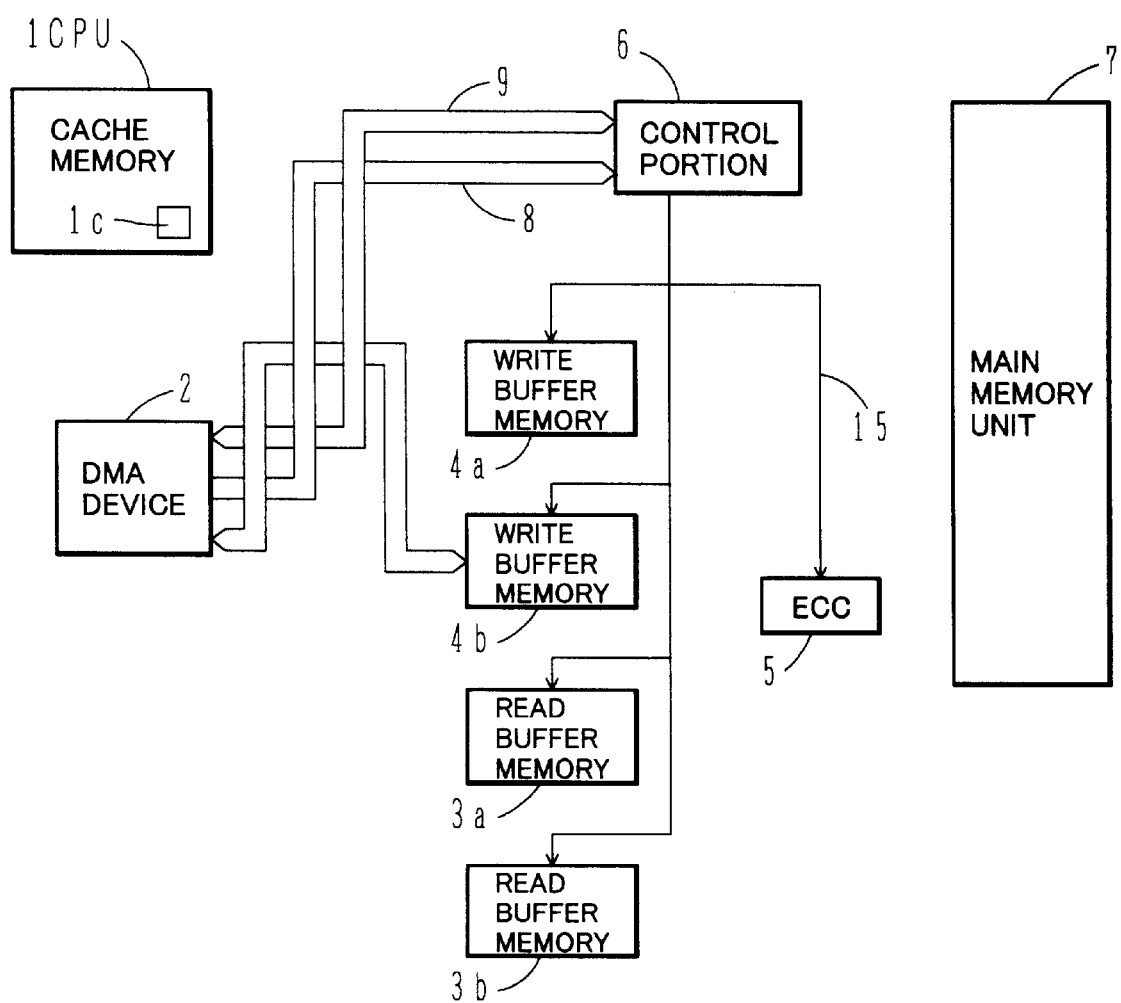
FIG. 20 is a block diagram showing write operation from the DMA device to the other write buffer memory.

The operation executed when there is a write buffer memory holding the data at addresses different from the write access address only in lower bits of fixed length or the operation executed when there is an empty write buffer memory, is shown in FIGS. 19 and 20.

FIG. 19 shows write access from the CPU 1 to the main memory unit 7 when the write buffer memory 4a holds the data at addresses different from the write access address only in lower bits of fixed length, or when the write buffer memory 4a is empty.

FIG. 20 shows write access from the DMA device 2 to the main memory unit 7 when the write buffer memory 4b holds the data at addresses different from the write access address only in lower bits of fixed length, or when the write buffer memory 4b is empty.

Figure 21:
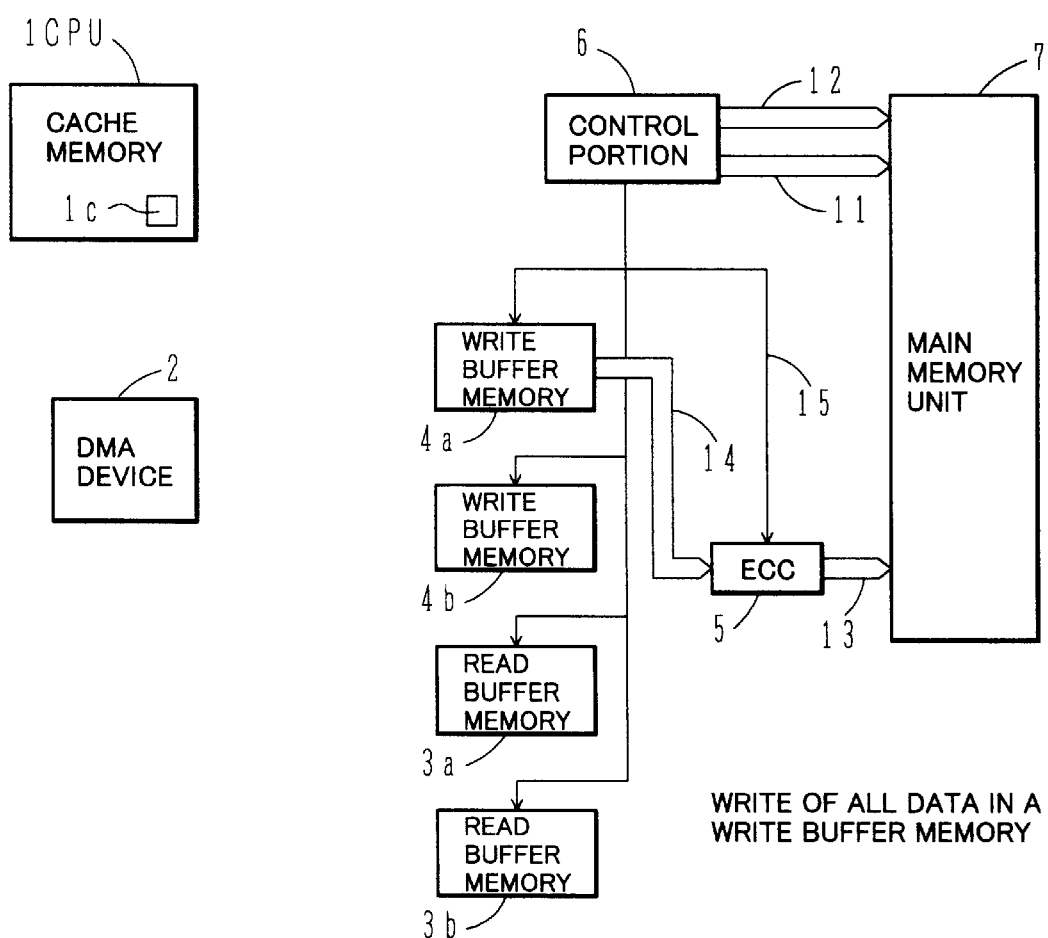
FIG. 21 is a block diagram showing write operation from the write buffer memory to the main memory unit.

FIG. 21 shows the operation executed when the write buffer memory has become full by writing of data or the operation executed when all the write buffer memories are occupied at the time of writing the written data.

In FIG. 21, the write buffer memory 4a is a write buffer memory which has become full by writing of data, or the oldest write buffer memory in the history of use when all the write buffer memories are occupied. The write buffer memory 4a is made empty by writing all contents of the write buffer memory 4a into the main memory unit 7.

Figure 22:
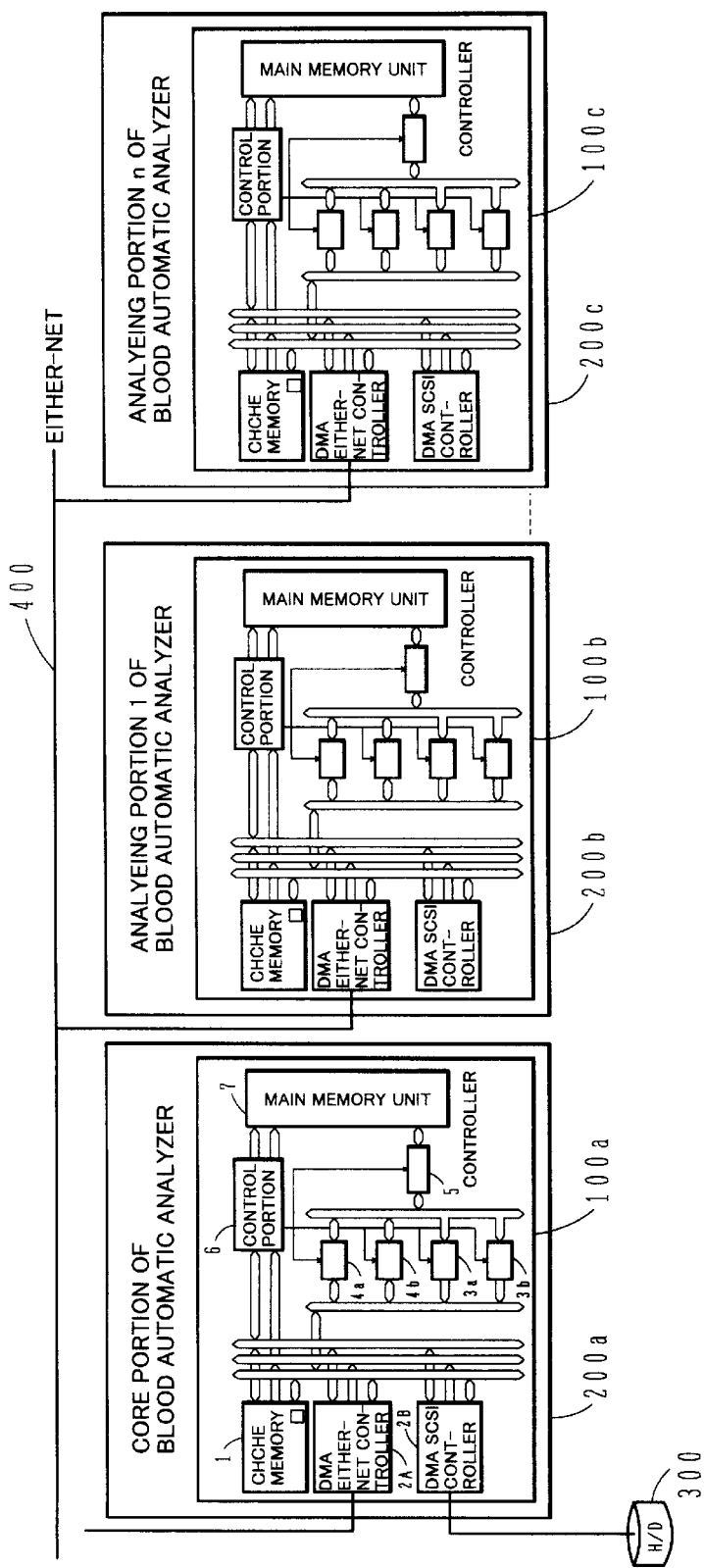
FIG. 22 is a block diagram showing the construction of a blood automatic analyzer incorporating controllers to each of which the main memory control apparatus of the present invention is applied.

FIG. 22 is a block diagram showing the construction of a blood automatic analyzer incorporating controllers to each of which the main memory control apparatus of the present invention is applied.

The blood automatic analyzer comprises one core portion 200a having an H/D (hard disk) 300 and a plurality of analyzing portions 200b, . . . 200c interconnected via an either-net 400.

The H/D 300 connected to the core portion 200a stores data transmitted from the analyzing portions 200b, . . . 200c. The core portion 200a receives commands and data both transmitted from the analyzing portions 200b, . . . 200c, executes necessary processes such as loading of the data into the H/D 300 and calculation based on data in the H/D 300, and then returns responses to the analyzing portions 200b, . . . 200c.

On the other hand, the analyzing portions 200b, . . . 200c wait for responses from the core portion 200a after issuing commands to the core portion 200a, and then carry out subsequent operations in accordance with results of the responses. Therefore, a throughput of the analyzing portions 200b, . . . 200c is improved with an increase in data transmitting and receiving speed through the either-net 400 and command processing speed in the core portion 200a.

The core portion 200a and the analyzing portions 200b, . . . 200c incorporate respective controllers 100a, 100b, . . . 100c to each of which the main memory control apparatus of the present invention is applied. In the analyzer of FIG. 22, the controllers 100a, 100b, . . . 100c each comprise two DMA devices, i.e., an either-net controller 2A and an SCSI controller 2B.

The either-net controller 2A controls transmission and reception of commands and data through the either-net 400, and the SCSI controller 2B performs access control of the H/D 300. The CPU 1 processing commands does not transfer data directly to and from the either-net 400 and the H/D 300. Transfer of data between the CPU 1 and the either-net controller 2A as well as the SCSI controller 2B is effected in such a manner that the CPU 1 transfers data to and from the either-net controller 2A and an SCSI controller 2B via an area of the main memory unit 7 from which data cannot be loaded into the cache memory.

By thus applying the present invention, an access time to the main memory unit 7 which is used by the CPU 1, the either-net controller 2A and the SCSI controller 2B in common can be cut down.

Therefore, speeds of data transfer between the CPU 1 and the either-net 400 and between the CPU 1 and the H/D 300 can be increased.

As a result, it is possible in the blood automatic analyzer to speed up responses from the core portion 200a to commands from the analyzing portions 200b, . . . 200c and hence increase a throughput of the analyzing portions 200b, . . . 200c.

The present invention constructed as described above have advantages below. The CPU and the DMA device employ in common an address area of the main memory unit from which data cannot be loaded into the cache memory in the CPU, while the contents in the remaining memory area of the main memory unit can be partly loaded into the cache memory. Therefore, an access time to the main memory unit is shortened upon a hit with the cache memory. Since data in the memory area of the main memory unit to which the DMA device makes write access will never exist in the cache memory, consistency of data between the cache memory and the main memory unit can be maintained and a need of invalidating data in the cache memory at the DMA start-up is eliminated. Accordingly, even a CPU having no snooping function can achieve more efficient use of the cache memory, increase a cache hit ratio, and shorten an average access time.

Data in the memory area of the main memory unit which is used by the CPU and the DMA device in common is partly loaded in a read buffer memory and a write buffer memory which can be accessed at a higher speed than the main memory unit. Data at successive addresses is loaded in the read buffer memory, data access from the CPU has localization in time and space, and access from the DMA device to the main memory unit is made to successive addresses.

Therefore, access to the memory area of the main memory unit which is used by the CPU and the DMA device in common has a high hit ratio with the read buffer memory, resulting in a shorter average access time.

Also, for the above reasons, the probability that addresses of data written in the write buffer memory continue successively is high. Accordingly, an average data access time to the main memory unit can be shortened by transferring data between the main memory unit and the read buffer memory or the write buffer memory in a high-speed burst mode.

Further, since the ECC executing unit performs the ECC on data written into the main memory unit, data integrity can be maintained with high reliability. In addition, since data is loaded into the read buffer memory after being subjected to the ECC, the ECC execution time can be cut out when there occurs a hit with the read buffer memory, resulting in an even shorter data access time.

Moreover, by providing a plurality of read buffer memories, data at addresses different from the read access address from the CPU only in lower bits of fixed length and data at addresses different from the read access address from the DMA device only in lower bits of fixed length can be loaded into separate read buffer memories.

Consequently, when read access from the CPU and read access from the DMA device are alternately made to successive addresses in different areas from each other, these access operations can be performed alternately and hence the data access time can be cut down.

What is claimed is:

1. A main memory control apparatus for use in a computer system having main memory, a CPU incorporating a cache memory, and an access enable device capable of making direct memory access to said main memory, said main memory including a first address area allocated as an address area from which data is loaded into said cache memory in said CPU but inhibiting data access from said access enable device to said first address area, and a second address area allocated as an address area to which data is accessed from said access enable device but inhibiting data from being loaded into said cache memory in said CPU from said second address area, said main memory control apparatus controlling data access to said main memory, comprising:

a read buffer memory storing data stored in said second address area and, in response to a data access request from said CPU or access enable device, transferring the stored data to the one of said CPU and access enable device issuing a read request;

a write buffer memory storing data to be written into said main memory from said CPU or access enable device; and a control portion, when said CPU or access enable device issues a data read request, operating in such a manner that, said control portion retrieves said read buffer memory, if data to be read exists in said read buffer memory, said control portion transfers said data in said read buffer memory to said CPU or access enable device issuing the read request, and, if data to be read does not exist in said read buffer memory, said control portion retrieves said write buffer memory, and if data to be read exists in said write buffer memory, said control portion transfers said data in said write buffer memory to said CPU or access enable device issuing the read request, and if data to be read does not exist in said write buffer memory, said control portion reads from said second address area data at addresses different from the address under the read request from said CPU or access enable device only in lower bits of fixed length, and loads the read data into said read buffer memory while transferring the read data to said CPU or access enable device issuing the read request.

2. A main memory control apparatus according to claim 1, wherein multiple read buffer memories are provided.

3. A main memory control apparatus according to claim 2, further comprising a write buffer memory capable of loading therein data requested by said CPU or access enable device to be written into said main memory means, said control portion loading data under a write request from said CPU or access enable device into said write buffer memory and writing the loaded data into said main memory means.

4. A main memory control apparatus according to claim 3, wherein multiple write buffer memories are provided.

5. A main memory control apparatus according to claim 1, further comprising a write buffer memory capable of loading therein data requested by said CPU or access enable device to be written into said main memory means, said control portion loading data under a write request from said CPU or access enable device into said write buffer memory and writing the loaded data into said main memory means.

6. A main memory control apparatus according to claim 5, wherein multiple write buffer memories are provided.

7. A main memory control apparatus according to claim 5, wherein said control portion retrieves said read buffer memory when said CPU or access enable device issues a data read request, if data to be read exists in said read buffer memory, said control portion transfers said data in said read buffer memory to said CPU or access enable device, if data to be read does not exist in said read buffer memory, said control portion retrieves said write buffer memory, said control portion transfers said data in said write buffer memory to said CPU or access enable device, if data to be read does not exist in said write buffer memory, said control portion reads from said main memory means data at addresses different from the address under the read request from said CPU or access enable device only in lower bits of fixed length, said control portion loads the read data into said read buffer memory while transferring the read data to said CPU or access enable device issuing the access request.

8. A main memory control apparatus according to claim 1, further comprising data error checking and correcting means, said control portion making control when said CPU or access enable device issues a data read request, in such a manner that, if data to be read does not exist in said read buffer memory, said control portion reads from said main memory means data at addresses different from the address under the read request from said CPU or access enable device only in lower bits of fixed length, instructs said data error checking and correcting means to perform error checking and correcting of the read data, and then loads the read data into said read buffer memory while transferring the read data to said CPU or access enable device issuing the access request.

9. A main memory control apparatus according to claim 8, wherein multiple read buffer memories are provided.

10. A main memory control apparatus according to claim 8, further comprising a write buffer memory capable of storing data requested to write into said main memory means by said CPU or access enable device, said control portion loading data under a write request from said CPU or access enable device into said write buffer memory, producing check bits for the loaded data by said data error checking and correcting means, and writing the produced check bits and the loaded data in said write buffer memory into said main memory means.

11. A main memory control apparatus according to claim 10, wherein multiple write buffer memories are provided.

12. A main memory control apparatus according to claim 10, wherein said control portion retrieves said read buffer memory when said CPU or access enable device issues a data read request, if data to be read exists in said read buffer memory, said control portion transfers said data in said read buffer memory to said CPU or access enable device, if data to be read does not exist in said read buffer memory, said control portion retrieves said write buffer memory, said control portion transfers said data in said write buffer memory to said CPU or access enable device, if data to be read does not exist in said write buffer memory, said control portion reads from said main memory means data at addresses different from the address under the read request from said CPU or access enable device only in lower bits of fixed length, said control portion loads the read data into said read buffer memory while transferring the read data to said CPU or access enable device issuing the access request.

13. A main memory control apparatus according to claim 9, further comprising a write buffer memory capable of storing data requested to write into said main memory means by said CPU or access enable device, said control portion loading data under a write request from said CPU or access enable device into said write buffer memory, producing check bits for the loaded data by said data error checking and correcting means, and writing the produced check bits and the loaded data in said write buffer memory into said main memory means.

14. A main memory control apparatus according to claim 13, wherein multiple write buffer memories are provided.

15. A method of controlling data access to a main memory in a computer system having a CPU incorporating a cache memory, an access enable device capable of making direct memory access to a main memory, said main memory including a first address area allocated as an address area from which data is loaded into said cache memory in said CPU but inhibiting data access from said access enable device to said first address area, and a second address area allocated as an address area to which data is accessed from said access enable device but inhibiting data from being loaded into said cache memory in said CPU from said second address area, a read buffer memory storing data stored in said second address area and transferring the stored data in response to a data access request from said CPU or access enable device to said CPU or access enable device issuing the read request, and a write buffer memory storing data to be written into said main memory from said CPU or access enable device, comprising the steps of:

when said CPU or access enable device issues a data read request, carrying out control in such as to, retrieve said read buffer memory, if data to be read exists in said read buffer memory, transfer said data in said read buffer memory to said CPU or access enable device issuing the read request;

retrieve said write buffer memory, if data to be read does not exist in said read buffer memory, and if data to be read exists in said write buffer memory, transfer said data in said write buffer memory to said CPU or access enable device issuing the read request; and read from said second address area data at addresses different from the address under the read request from said CPU or access enable device only in lower bits of fixed length, if data to be read does not exist in said write buffer memory, and load the read data into said read buffer memory while transferring the read data to said CPU or access enable device issuing the read request.

16. The method according to claim 15, further comprising:

performing data error checking and correcting when said CPU or access enable device issues a data read request which is read from said main memory at addresses different from the address under the read request from said CPU or access enable device only in lower bits of fixed length; and then loading the read data into said read buffer memories while transferring the read data to said CPU or access enable device issuing the access request.

17. The method according to claim 16, further comprising:

loading data into a plurality of write buffer memories under a write request from said CPU or access enable device; and producing check bits for the loaded data and writing the produced check bits and the loaded data in said write buffer memory into said main memory.

18. A main memory control apparatus for use in a computer system having main memory, a CPU incorporating a cache memory, and an access enable device capable of making direct memory access to said main memory, said main memory including a first address area allocated as an address area from which data is loaded into said cache memory in said CPU but inhibiting data access from said access enable device to said first address area, and a second address area allocated as an address area to which data is accessed from said access enable device but inhibiting data from being loaded into said cache memory in said CPU from said second address area, said main memory control apparatus controlling data access to said main memory comprising:

a read buffer memory storing data stored in said second address area;

a plurality of write buffer memories storing data to be written into said main memory from said CPU or access enable device; and a control portion operating, when said CPU or access enable device issues a data write request, in such a manner that: said control portion retrieves said read buffer memory, if data exists in said read buffer memory's address requested by said data write request, said control portion nullifies data in said read buffer memory, and retrieves said write buffer memory having data address different from the address under the write request only in lower bits of fixed length, if said write buffer memory having said data address exists, said control portion writes data requested to be written into said write buffer memory having said data address, if said write buffer memory having said data address does not exist, said control portion writes said data requested to be written into an empty write buffer memory.

19. A main memory control apparatus according to claim 18, wherein if an empty write buffer memory does not exist, said control portion retrieves the oldest write buffer memory in history of use, writing contents in said oldest write buffer memory into said main memory, emptying said oldest write buffer memory, writing data from said CPU or access enable device into said oldest write buffer memory.

20. A method of controlling data access to a main memory in a computer system having a CPU incorporating a cache memory, an access enable device capable of making direct memory access to a main memory, said main memory including a first address area allocated as an address area from which data is loaded into said cache memory in said CPU but inhibiting data access from said access enable device to said first address area, and a second address area allocated as an address area to which data is accessed from said access enable device but inhibiting data from being loaded into said cache memory in said CPU from said second address area, a read buffer memory storing data stored in said second address area, and a plurality of write buffer memories storing data to be written into said main memory from said CPU or access enable device, comprising the steps of:

retrieving said read buffer memory when said CPU or access enable device issues a data write request, if data exists in said read buffer memory's address requested by said data write request, nullifying data in said read buffer memory;

retrieving a write buffer memory having data address different from the address under the write request only in lower bits of fixed length;

writing data requested to be written into said write buffer memory having said data address when said data address exists in said write buffer memory; and writing data requested to be written into an empty write buffer memory when said write buffer memory having said data address does not exist.

21. A method of controlling data access according to claim 20, further comprising the steps of:

retrieving the oldest write buffer memory in history of use when an empty write buffer memory does not exist, writing contents in said oldest write buffer memory into said main memory; and emptying said oldest write buffer memory, writing data from said CPU or access enable device into said oldest write buffer memory.

* * * * *